(12) United States Patent
Trennepohl

(10) Patent No.: US 12,514,146 B2
(45) Date of Patent: Jan. 6, 2026

(54) BRACING SYSTEM APPLICABLE TO A MODULAR CHASSIS FOR AGRICULTURAL MACHINES AND IMPLEMENTS

(71) Applicant: Stara S/A. Industria de Implementos Agrícolas, Não-Me-Toque (BR)

(72) Inventor: Átila Stapelbroek Trennepohl, Não-Me-Toque (BR)

(73) Assignee: Stara S/A. Industria de Implementos Agrícolas, Não-Me-Toque (BR)

( * ) Notice: Subject to any disclaimer, the term of this patent is extended or adjusted under 35 U.S.C. 154(b) by 362 days.

(21) Appl. No.: 17/594,790

(22) PCT Filed: Feb. 19, 2020

(86) PCT No.: PCT/BR2020/050048
§ 371 (c)(1),
(2) Date: Oct. 29, 2021

(87) PCT Pub. No.: WO2020/220101
PCT Pub. Date: Nov. 5, 2020

(65) Prior Publication Data
US 2024/0237568 A1 Jul. 18, 2024

(30) Foreign Application Priority Data
Apr. 29, 2019 (BR) .................. 102019008649-1

(51) Int. Cl.
*A01B 73/06* (2006.01)
*A01B 73/00* (2006.01)
*A01B 73/02* (2006.01)

(52) U.S. Cl.
CPC ............ *A01B 73/065* (2013.01); *A01B 73/06* (2013.01); *A01B 73/00* (2013.01); *A01B 73/02* (2013.01)

(58) Field of Classification Search
CPC ....... A01B 73/00; A01B 73/02; A01B 73/046; A01B 73/06; A01B 73/062; A01B 73/065; A01B 73/067
(Continued)

(56) References Cited

U.S. PATENT DOCUMENTS 3,302,956 A 2/1967 Sosalla
3,954,144 A * 5/1976 Blair ...................... A01B 73/02
172/311

(Continued)

FOREIGN PATENT DOCUMENTS

WO WO2020220101 11/2020

OTHER PUBLICATIONS

International Search Report for PCT/BR2020/050048 dated May 8, 2020, 4 pp.

*Primary Examiner* — Christopher J Sebesta
*Assistant Examiner* — Audrey L Lusk
(74) *Attorney, Agent, or Firm* — Neal, Gerber & Eisenberg LLP

(57) ABSTRACT

A mode of a bracing system applicable to a modular chassis for agricultural machines and implements, which considerably attenuates or reduces shear and bending effects on the joints (A) between the modular sections of the tilting lateral chassis during the respective working operations of the agricultural machine/implement. A bracing structure (1) made up of a supporting tower (2) arranged transversally and horizontally aligned facing the respective joint (A) between adjacent sections, the section closest (B) to the central drawbar (F) of the machine and the immediately adjacent section (D), adjustable tie rods (3) being arranged at the top of tower (2), the ends of which are rigidly connected to and draw these adjacent sections (B) and (D); the supporting tower (2) being tilted to a vertical position,
(Continued)

under the action of an actuator or actuators (4) when the machine is switched from the working position to the transport position.

3 Claims, 3 Drawing Sheets

(58) Field of Classification Search
USPC .......................................................... 172/776
See application file for complete search history.

(56) References Cited

U.S. PATENT DOCUMENTS

| | | | | |
|---|---|---|---|---|
| 3,960,221 A * | 6/1976 | Blair | ...................... | A01B 73/02 |
| | | | | 172/311 |
| 4,157,735 A * | 6/1979 | Olsson | ................. | A01B 73/005 |
| | | | | 172/240 |
| 4,723,787 A * | 2/1988 | Hadley | ................. | A01B 73/065 |
| | | | | 280/412 |
| 5,029,757 A * | 7/1991 | Bourgault | ........... | A01M 7/0053 |
| | | | | 239/169 |
| 5,609,214 A * | 3/1997 | Vermaak | ................ | A01C 7/208 |
| | | | | 172/776 |
| 5,660,237 A * | 8/1997 | Boyko | ................. | A01B 73/067 |
| | | | | 172/311 |
| 6,112,827 A * | 9/2000 | Reiber | ................. | A01B 73/065 |
| | | | | 172/311 |
| 6,263,978 B1 * | 7/2001 | Friggstad | ............. | A01B 59/042 |
| | | | | 172/776 |
| 6,315,055 B1 * | 11/2001 | Friggstad | ............. | A01B 59/042 |
| | | | | 172/776 |
| 6,325,155 B2 * | 12/2001 | Friggstad | ................ | A01B 73/02 |
| | | | | 172/776 |
| 6,550,543 B1 * | 4/2003 | Friggstad | ............... | A01B 63/32 |
| | | | | 172/311 |
| 7,003,835 B2 | 2/2006 | Figg, Jr. et al. | | |
| 8,127,861 B2 * | 3/2012 | Meek | ................... | A01B 73/065 |
| | | | | 172/311 |
| 2015/0319912 A1 | 11/2015 | Stevenson | | |
| 2016/0286781 A1 | 10/2016 | Mariani et al. | | |

* cited by examiner

1

BRACING SYSTEM APPLICABLE TO A MODULAR CHASSIS FOR AGRICULTURAL MACHINES AND IMPLEMENTS

CROSS-REFERENCE TO RELATED APPLICATIONS

This application is a U.S. national phase application of PCT/BR2020/050048, filed on Feb. 19, 2020, which claims priority to Brazilian Patent Application No. BR102019008649-1, filed on Apr. 29, 2019. These applications are incorporated by reference herein in their entireties.

THE TECHNOLOGICAL SECTOR OF INVENTION

The present invention relates generally to the technological sector of agricultural machines and implements and, in particular, the peculiar mode of the bracing system applicable to a forward tilted modular chassis for agricultural machines and implements, aiming to draw lateral modules, in opposite direction to the machine displacement, and to avoid excessive effort in the joints between them, which allow the machine to follow the unevenness of the ground, during respective working operations.

Effectively, the purpose of the present invention is the peculiar mode of the bracing system applicable to a forward tilted modular chassis for agricultural machines and implements, which is carefully and thoughtfully designed to aim something unique and outstanding when compared to other prior art in the technology sector known already.

BACKGROUND OF THE INVENTION

It is well-known that through the prior art of this technology sector and to the present moment that agricultural machines and implements known already feature a wide extension in the transverse direction (great width) when traveling, considering that there is the economic necessity of covering the maximum of soil areas as possible, at each passing of the agricultural machine or implement, to have fuel economy, labor, working hours, etc.

Together with this characteristic, there is also the need for agricultural machines and implements to have the technical capacity to reduce its width, when not working, so that it can be driven to a parking place (shed or similar), traveling on roadways, and even state and federal highways that are subject to an official regulation regarding the maximum vehicle width that can travel on them.

In this regard, agricultural machines and implements feature a modular chassis, usually with a fixed central section (F) and lateral sections (B, D, E) that tilt—either horizontally forward or backwards, or vertically upwards—to reduce the sideways size of the agricultural machines or implements.

The characteristics described above can be seen in the attached DRAWINGS 01 to 05, which illustrate both a complete machine (represented for illustrative purposes only, other models and types may be considered) in working position (FIG. 01) and in transport position (FIG. 02), and the modular chassis (the central section which normally has the front draw bar incorporated, with the lateral tilting sections—in this case, tilting horizontally forward) in working position (FIG. 03) and transport position (FIGS. 04 and 05).

Due to the soil unevenness to be worked, the agricultural machines and implements manufacturers, also chose to modulate the lateral tilting chassis, connecting the sections (B, D, E) through joints (A) that permit vertical movements of the respective sections allowing them to follow the soil unevenness to be worked.

Like any technological evolution created and developed to solve a technical problem, so that the agricultural machine or implement could follow soil unevenness to be worked—modularity of the lateral chassis through the joints (A) between the adjacent sections (B, D, E)—another problem was found (as well as a drug created to be effective against the harm of some disease, but which presents harmful side effects, for which it is necessary to give another drug to the patient) that affects the vast majority of agricultural machines and implements known in the market.

The technical problem resulting from the traction effort required to move the agricultural implement or machine on the soil to be worked, usually with cultivators and/or furrow openers and/or cutting disk that enter twenty centimeters (20 cm) in the soil, for example, which causes the emergence of shear stress and bending forces on the joints (A) of sections (B, D, E) of the modular lateral tilting chassis.

The shear and bending effects are most felt in the sections (D, E) farthest from the fixed central chassis (F) with the draw bar of the agricultural machine or implement since the closest section (B) to the lateral tilting chassis of this drawbar (F) shows good resistance or rigidity to these shear or bending effects, they are connected to it through the lateral tie rods (C), which are responsible for lateral chassis tilting process (B, D, E) relatively to the central chassis (F) with the drawbar of the agricultural machine or implement.

In other words, during the forward tilting agricultural machine or implement operation, the modular lateral chassis (B, D, E) is drawn backwards as a reaction to the movement in front of the implement or agricultural machine, causing various problems and, in some more extreme cases, even the rupture of the articulated joint (A) of the lateral tilting chassis modular section (B, D, E).

In research carried out in the agricultural machinery and implements sector, no technical solutions were found to the specific problem reported.

To meet the current law; these prior art patent documents, which shall be important to understand the present object of this application, are mentioned in US20160286781 A1 (technology sector of agricultural machinery and implements) and U.S. Pat. No. 7,003,835B2 and BR102013022967-9 (technology sector of building sector).

The document US20160286781A1, deposited on Nov. 8, 2013 and published on Oct. 6, 2016 by King Marvine S.A (ES), entitled "Support for a spreading boom for an agricultural sprayer", discloses spray boom support for an agricultural sprayer including two articulated arms that are coupled in an articulated manner on both sides of the sprayer, wherein each articulated arm is comprised of bar sections that are formed in a composite material consisting of a reinforcing agent chosen from carbon fiber, fibreglass, aramid fibre, boron fibre or a combination thereof, and a matrix of epoxy, vinyl ester, phenolic polyester resin, the bar sections having a tube geometry with a substantially rectangular cross section with rounded vertices and arched sides; the length of two of its equal sides being constant along the bar section. It also discloses a latticed structure that aims to support the weight of the spray booms, which tend to bend during the field work.

The document U.S. Pat. No. 7,003,835B2, deposited on Oct. 15, 2004 and granted on Feb. 28, 2006, by Figg Bridge Engineers Inc. (US), entitled "Cable-stay cradle system", reveals a cradle system for cable stayed bridges mounted onto a cable, the opposite ends of which are attached to anchors on a bridge deck, disposed along the length of the cable stay and located in a pre-formed opening in a pylon, including axially spaced sleeve centering plates that have radially spaced holes through which the cable stands of the cable stay are threaded, ensuring that the distance from the center-points of the adjacent cable stands remains essentially constant along the entire length of the cradle system; It also reveals a method of installing a cable stay including a cradle system, which includes the steps of threading the cable stay through the opening in the pylon in order to locate the cradle system in the opening and attaching the cable stay to anchors on the bridge deck.

The document BR102013022967-9, deposited on Sep. 9, 2013 and published on Apr. 19, 2016, by the Universidade de São Paulo—USP (University of São Paulo), entitled "Tree-type cable-stayed structural system" discloses a tree-type cable-stayed structural system consisting of a supporting column; a base module that works as a support for the entire structure; a slab module that rests on the base module; and at least one cable stay.

The mentioned documents are considered as documents defining the general state of the art, but are not considered to be of particular relevance, with respect to the objectives to be achieved by the present invention, described below.

Novelty and Objective of the Invention

Therefore, the present invention aims to characterize the peculiar mode of a bracing system applicable to a forward titled modular chassis for agricultural machines and implements, which considerably attenuates or reduces the shear and bending effects on the joints between the modular sections of the lateral tilting chassis during the respective working operations of the agricultural machine/implement.

The objective is to characterize the peculiar mode of a bracing system applicable to a forward tilted modular chassis for agricultural machines and implements, which will draw the lateral chassis sections, providing considerably rigidity or resistance to regular efforts, shear, bending, etc., that occurred on them during the working operation of the agricultural machines and implements.

The objective is to characterize the peculiar mode of a bracing system applicable to a forward tilted modular chassis for agricultural machines and implements, consisted of a supporting tower arranged transversally and horizontally aligned facing the respective joint between the adjacent sections—the section closest to the central draw bar of the machine and the immediately adjacent section—adjustable tie rods being arranged at the top of this tower, the ends of which are rigidly connected to and draw these adjacent sections; the supporting tower being tilted to a vertical position, under the action of an actuator or actuators—these being hydraulic, electrical, mechanical or manual—when the machine is switched from the working position to the transport position, in order not to interfere with the other sections of the agricultural machine and implement.

The objective is to characterize the peculiar mode of a bracing system applicable to a forward tilted modular chassis for agricultural machines and implements, in which there is the possibility to present an adjustable tie rod installed at the top of the supporting tower and rigidly connected to and drawing the furthest section from the fixed central chassis with the front draw bar.

The objective is to characterize the peculiar mode of a bracing system applicable to a forward tilted modular chassis for agricultural machines and implements, in which there is the possibility to present another bracing structure, drawing the adjacent sections further from the central draw bar.

DESCRIPTION OF THE DRAWINGS

So that the disclosed invention in this descriptive application, whatever peculiar mode of the bracing system applicable to a modular chassis for agricultural machines and implements, is fully understood into practice by any technician in the technology sector, it is explained clearly, concisely and enough to allow its reproduction, based on the attached drawings listed below.

Nevertheless, the peculiar mode of the bracing system applicable to a forward tilted modular chassis for agricultural machines and implements is not supposed to be limited to this characterization and embodiment, other possible forms of materialization may be considered, however, the objective of this invention must remain the same, as described in this application.

Figure 1:
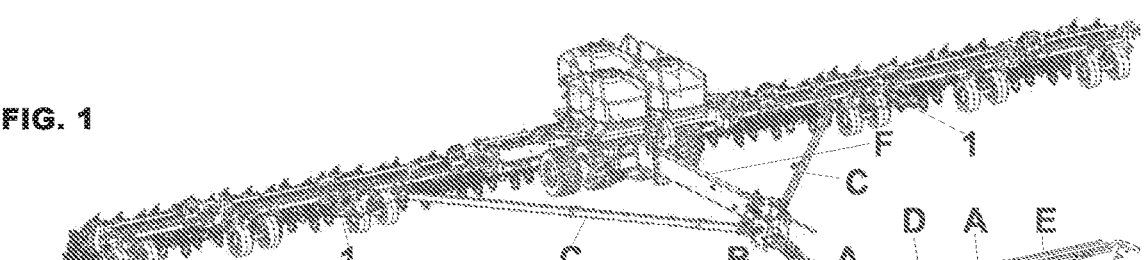
Figure 3:
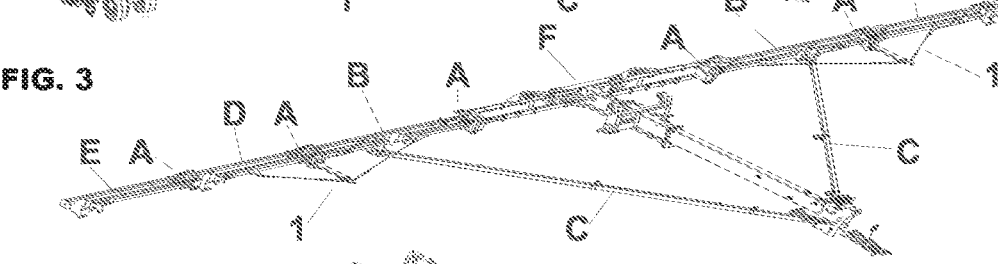
Figure 2:
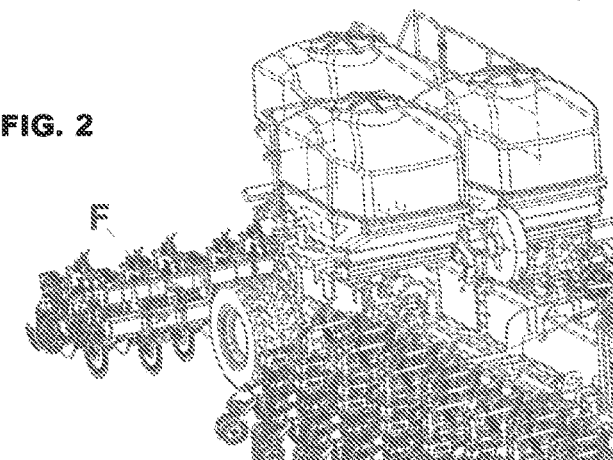
Figure 4:
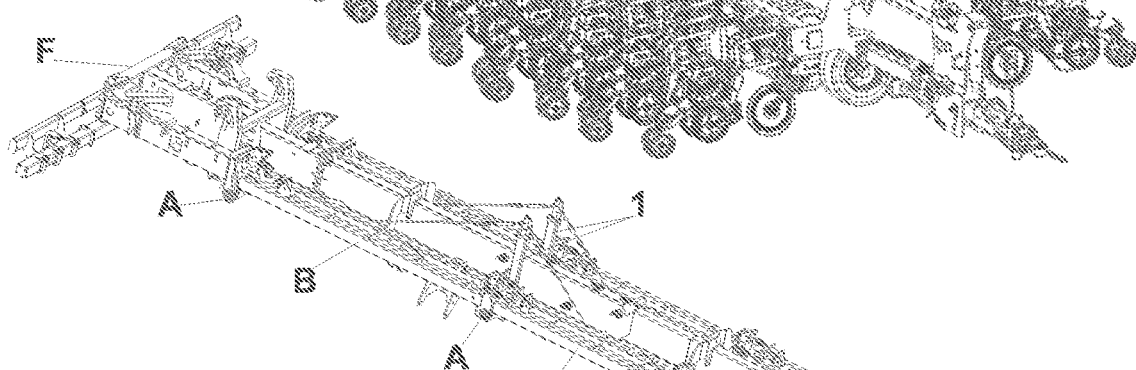
Figure 5:
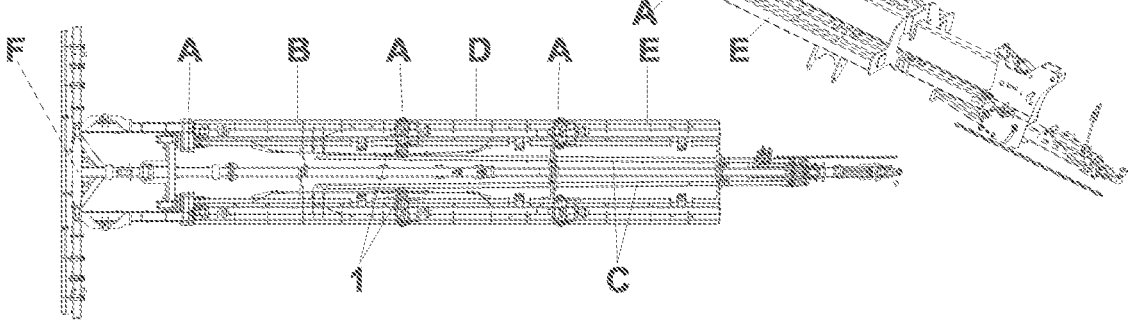
Figure 6:
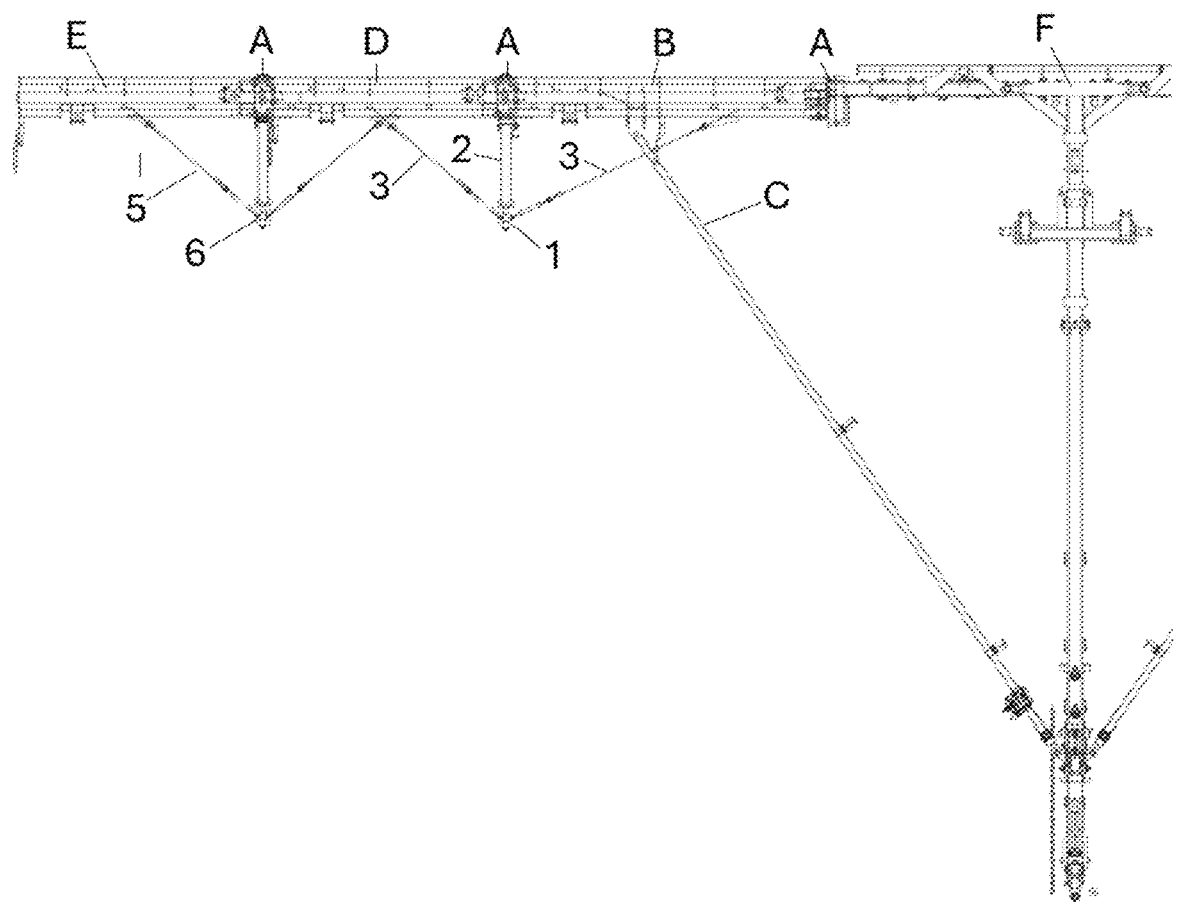
Figure 7:
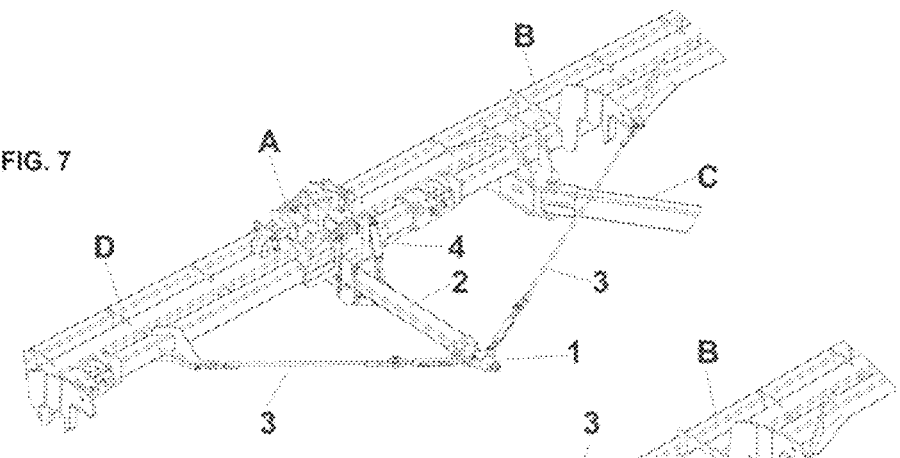
Figure 8:
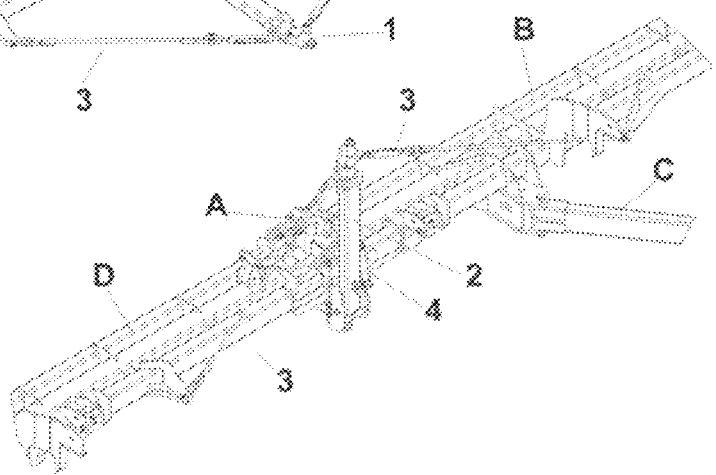
Figure 9:
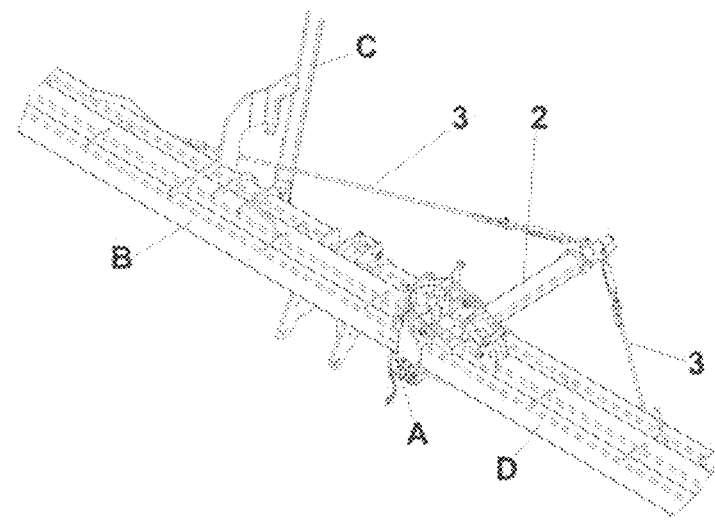

The attached drawings are described as follows:

FIG. 01 represents an isometric perspective view of an agricultural machine or implement forward tilted in working position with the peculiar mode of the bracing system applicable to a modular chassis for agricultural machines and implements, performed as claimed by the said invention;

FIG. 02 represents an isometric perspective view of an agricultural machine or implement in transport position with the peculiar mode of the bracing system applicable to a modular chassis for agricultural machines and implements, performed as claimed by the said invention;

FIG. 03 represents an isometric perspective view of a chassis in working position with the peculiar mode of the bracing system applicable to a forward tilted modular chassis for agricultural machines and implements, performed as claimed by the said invention;

FIG. 04 represents an isometric perspective view of a chassis in transport position with the peculiar mode of the bracing system applicable to a forward tilted modular chassis for agricultural machines and implements, performed as claimed by the said invention;

FIG. 05 represents a top view of the modular chassis in transport position, illustrated in FIG. 04, with the peculiar mode of the bracing system applicable to a forward tilted modular chassis for agricultural machines and implements, performed as claimed by the said invention;

FIG. 06 represents a top view, partial, of the modular chassis with the peculiar mode of the bracing system applicable to a forward tilted modular chassis for agricultural machines and implements, performed as claimed by the said invention;

FIG. 07 represents a partial isometric perspective view of the lateral modular chassis, carried out under a top front angle, showing the peculiar mode of the bracing system applicable to a forward tilted modular chassis for agricultural machines and implements, performed as claimed by the said invention, in working position;

FIG. 08 represents a partial isometric perspective view of the lateral modular chassis, carried out under a top front angle, showing the peculiar mode of the bracing system applicable to a forward tilted modular chassis for agricultural machines and implements, performed as claimed by the said invention, in transport position;

FIG. 09 represents a partial isometric perspective view of the lateral modular chassis, carried out under a top back angle, showing the peculiar mode of the bracing system applicable to a forward tilted modular chassis for agricultural machines and implements, performed as claimed by the said invention, in working position;

DETAILED DESCRIPTION OF THE DRAWINGS

As can be inferred from the analysis of the attached drawings, the peculiar mode of a bracing system (1) applicable to a forward tilted modular chassis for agricultural machines and implements, consisted of a supporting tilting tower (2) arranged transversally and horizontally aligned facing the respective joint (A) between the adjacent sections—the section closest (B) to the central drawbar (F) of the machine and the immediately adjacent section (D)—adjustable tie rods (3) being arranged at the top of this tower (2), the ends of which are rigidly connected to and draw these adjacent sections (B) and (C); the supporting tilting tower (2) being tilted to a vertical position, under the action of an actuator or actuators (4)—these being hydraulic, electrical, mechanical or manual—when the machine is switched from the working position to the transport position, in order not to interfere with the other sections of the agricultural machine and implement.

The invention is also characterized by the fact that it is provided for the possibility of having an adjustable tie rod (5) installed at the top of the supporting tilting tower (2) and rigidly connected to and drawing the furthest section (E) from the fixed central chassis with the front draw bar (F).

The invention is also characterized by the fact that it is provided for the possibility of presenting another bracing structure (6) drawing the adjacent sections (D) and (E), further from the central chassis (F).

Thus, the objectives of this invention have been fully achieved, whatever is the peculiar mode of the bracing system applicable to forward tilted modular chassis for agricultural machines and implements, in comparison to the implements known in the state of the art, giving rise to numerous advantages under the most diverse aspects that can be analyzed, in addition to the undeniable new and unexpected technical effect, not integrated in the state of the art of this technological sector, as previously analyzed, and this effect is the basic technique for the granting of the intended privilege.

The object of the present invention was developed with the highest technology with the intention of solving problems and overcome failures, representing a considerable evolution when compared to what is known in the state of the art of this technological sector, guaranteeing a structural arrangement that provides considerable operational and functional improvement to the proposed implement, ensuring that all those objectives for which it was developed are met.

Therefore, the present invention of the peculiar mode of the bracing system applicable to modular chassis for agricultural machines and implements, featured as can be proven through the carried out analysis, the attached drawings and innovative technical features, when compared to all that has been seen of the prior art of this technology sector, this invention deserves official and formal protection.

The invention claimed is:

1. Bracing system applicable to a forward tilted modular chassis for agricultural machines and implements, comprised of a modular chassis comprised of a fixed central chassis (F) and forward tilting lateral chassis with sections (B), (D), (E), connected by joints (A), such that the agricultural tools of the machine or implement face outward when the forward tilting lateral chassis are tilted forward, wherein the bracing system is characterized by being located in a same pivoting center of the joints (A) arranged between two adjacent sections (B, D, E) of the lateral chassis and the bracing structure (1) comprised by a supporting tower (2) arranged transversally and horizontally aligned facing the respective joint (A) between the section closest (B) to the central chassis (F) of the modular chassis and the immediately adjacent section (D), and adjustable tie rods (3) being arranged at the top of this tower (2), the ends of which are rigidly connected to and draw these adjacent sections (B) and (C); the supporting tower (2) being tilted to a vertical position, under the action of an actuator or actuators (4) when the modular chassis is switched from the working position to the transport position.

2. Bracing system applicable to a forward tilted modular chassis for agricultural machines and implements, according to claim 1 and characterized by having an adjustable tie rod (5) installed at the top of the supporting tower (2) and rigidly connected to and drawing the furthest section (E) from the fixed central chassis (F) with a front drawbar.

3. Bracing system applicable to a forward tilted modular chassis for agricultural machines and implements, according to claim 1 and characterized by having another bracing structure (6) drawing the adjacent sections (D) and (E), further from the central chassis (F).

* * * * *